United States Patent
Wilson et al.

(10) Patent No.: US 8,807,657 B2
(45) Date of Patent: Aug. 19, 2014

(54) SEAT BELT ATTACHMENT CLAMP AND METHOD

(75) Inventors: Erik C Wilson, Decatur, IN (US); David M Gerst, Fort Wayne, IN (US); Samuel D Wagoner, Woodburn, IN (US); Patrick E Temple, Wapakoneta, OH (US); SanJeev Vij, Leo, IN (US); Eric DeView, Lansing, MI (US); John Swenson, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 124 days.

(21) Appl. No.: 13/583,331

(22) PCT Filed: Mar. 9, 2010

(86) PCT No.: PCT/US2010/026653
§ 371 (c)(1),
(2), (4) Date: Sep. 7, 2012

(87) PCT Pub. No.: WO2011/112182
PCT Pub. Date: Sep. 15, 2011

(65) Prior Publication Data
US 2013/0043711 A1    Feb. 21, 2013

(51) Int. Cl.
*B60R 22/18*    (2006.01)

(52) U.S. Cl.
USPC ............. 297/468; 297/463.1; 248/234.9; 403/71; 403/191; 403/234; 403/235

(58) Field of Classification Search
CPC ..................................... B60R 22/26
USPC .............. 297/468, 463.1; 248/220.21, 224.8, 248/225.11, 231.9, 693; 403/191, 234, 235, 403/71
See application file for complete search history.

(56) References Cited

U.S. PATENT DOCUMENTS

| | | | |
|---|---|---|---|
| 3,994,513 A * | 11/1976 | Courtis et al. | ................. 280/808 |
| 6,565,120 B2 | 5/2003 | Ganesan | |
| 6,974,192 B2 | 12/2005 | Miwa et al. | |
| 7,156,469 B2 | 1/2007 | Kennedy | |
| 2009/0008983 A1 * | 1/2009 | Ghatge | ......................... 297/468 |
| 2010/0219301 A1 * | 9/2010 | Sampson | ..................... 248/74.1 |

* cited by examiner

*Primary Examiner* — David R Dunn
*Assistant Examiner* — Jody Giacoman
(74) *Attorney, Agent, or Firm* — Jeffrey P. Calfa; Mark C. Bach

(57) ABSTRACT

A method and an attachment clamp for attaching a seat belt to a seat frame of a bus seat are provided. The attachment clamp includes at least one upper arm having at least one slot disposed through the at least one upper arm. The attachment clamp includes at least one lower arm that is received within the at least one slot of the at least one upper arm. A receiving channel is defined by the at least one upper arm and the at least one lower arm. The receiving channel is configured to receive the seat frame. The upper arm and the lower arm are pivotable with respect to each other and are fastenable to each other.

11 Claims, 1 Drawing Sheet

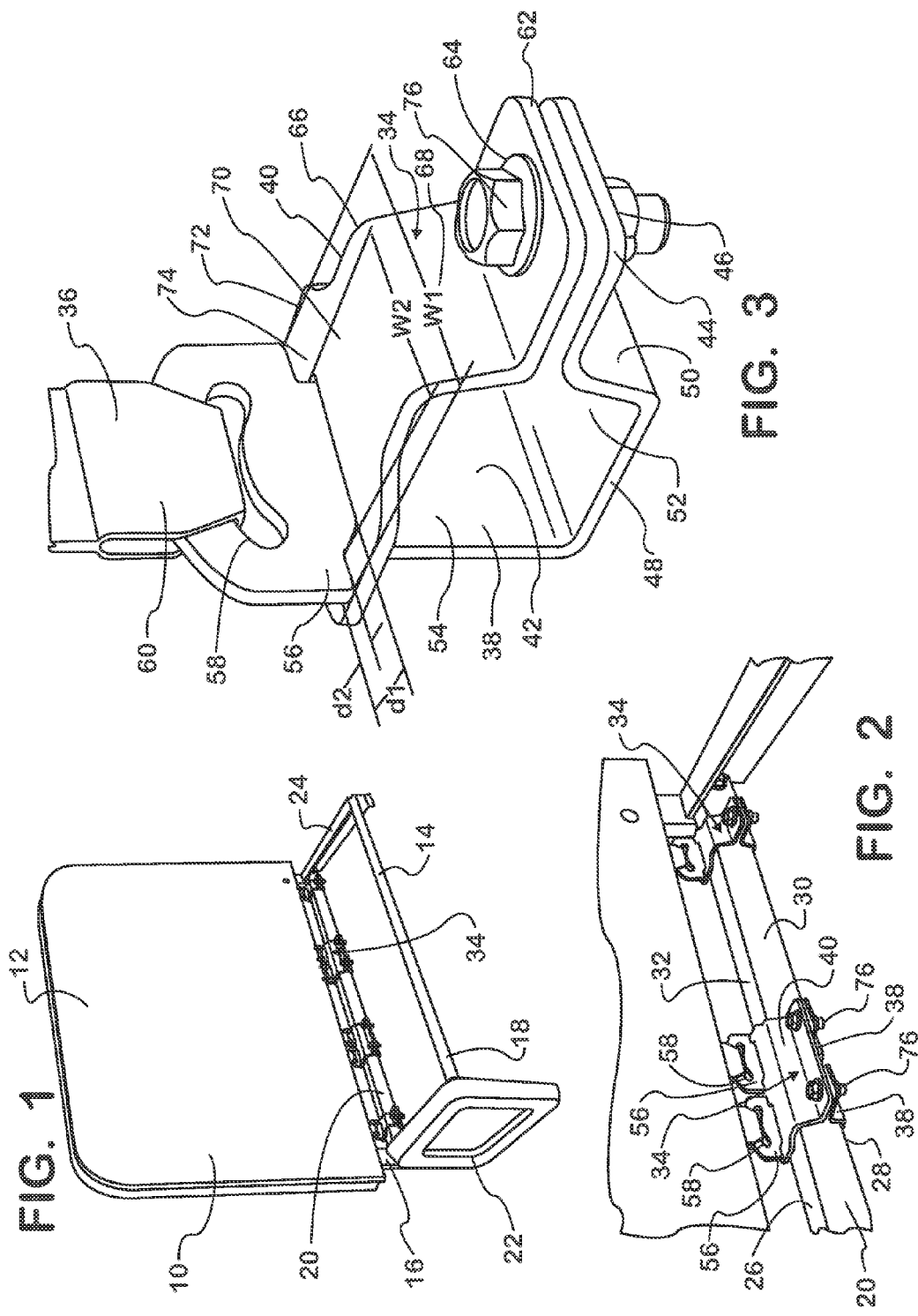

SEAT BELT ATTACHMENT CLAMP AND METHOD

BACKGROUND

Embodiments described herein relate to seat belts for vehicles. More specifically, embodiments described herein relate to a method and a seat belt attachment clamp for attaching a seat belt to a seat frame in a vehicle.

Seats on buses typically use passive restraints, which impede the motion of the occupant within a compartment or space, instead of seat belts, which positively restrain the occupant against the seat. As such, bus seats are not typically designed to accommodate seat belts. However in some instances, seat belts are added to school bus seats.

Bus seats are formed by attaching frame members together to form one or more sub-frames, such as a seat back sub-frame and a seat cushion sub-frame. When the sub-frames are assembled to form a seat frame, the seat cushion is attached to the seat frame. The seat frame is typically fixedly attached to the floor of the bus.

Adding a seat belt to the bus seat typically includes providing a non-standard seat frame so that the seat belt can be attached to the seat frame. The result of providing non-standard seat frames is that the bus has two different types of seat frames, one type of seat frame for passive restraints and one type of seat frame for seat belts. Mounting plates are often welded to the seat frame to provide mounting points for the seat belt. Additionally, bracketry and drilling operations are typically conducted to add the seat belt to the seat frame.

SUMMARY

Embodiments described herein provide a method and a seat belt attachment clamp for attaching a seat belt to a seat frame in a vehicle. In one embodiment, an attachment clamp for attaching a seat belt to a seat frame of a bus seat includes at least one upper arm having at least one slot disposed through the at least one upper arm. The attachment clamp also includes at least one lower arm that is received within the at least one slot of the at least one upper arm. A receiving channel is defined by the at least one upper arm and the at least one lower arm. The receiving channel is configured to receive the seat frame. The upper arm and the lower arm are pivotable with respect to each other and are fastenable to each other.

Another embodiment provides a method of attaching a seat belt to a seat frame. According to one method, an upper arm of an attachment clamp is provided. The upper arm has a slot disposed through a body portion of the upper arm. A lower arm of the attachment clamp having a shoulder portion having a seat belt retainer opening configured to receive a seat belt is provided. The lower arm is introduced into the slot of the upper arm until the shoulder portion of the lower arm engages the body portion of the upper arm. The lower arm and the upper arm are pivoted with respect to each other. The seat frame is introduced into a receiving channel formed by the upper arm and the lower arm. The lower arm and the upper arm are fastened together with a fastener.

BRIEF DESCRIPTION OF THE DRAWINGS

FIG. 1 is a perspective view of a seat frame with a plurality of attachment clamps.

FIG. 2 is a detail perspective view of the seat frame with the plurality of attachment clamps.

FIG. 3 is a perspective view of the attachment clamp.

DETAILED DESCRIPTION

Referring now to FIGS. 1-3, a seat for use in a bus (not shown) is indicated generally at 10, and is formed by attaching frame members together to form one or more sub-frames, such as a seat back sub-frame 12 and a seat sub-frame 14. When the sub-frames 12, 14 are assembled to form a seat frame 16, a seat cushion (not shown) is attached to the seat frame to form a bus seat 10.

The seat frame 16 may include a front cross member 18 and a rear cross member 20 that extend between a first seat riser 22 and a second seat riser 24. One or both of the seat risers 22, 24 may be attached to a floor of the bus (not shown). The rear cross member 20 extends from at least one of the seat risers 22, 24 generally perpendicularly. The rear cross member 20 may be generally elongate and generally rectangular prism-shaped, however other shapes are possible. The rear cross member 20 may have a top surface 26, a bottom surface 28 opposite the top surface, a front surface 30 and a rear surface 32 opposite the front surface.

An attachment clamp 34 is used to attach a seat belt 36 to the seat frame 16. The attachment clamp 34 is clamped to the rear cross member 20 of the seat frame 16. In this configuration, the seat frame 16 is a standard seat frame and the attachment clamp 34 is attached directly to the seat frame.

The attachment clamp 34 includes at least one lower arm 38 that is received within and cooperates with at least one upper arm 40 to define a receiving channel 42 configured to receive the rear cross member 20 of the seat frame 16. The receiving channel 42 is generally rectangular in cross-section, however other shapes are possible. Both the lower arm 38 and the upper arm 40 are formed of steel, however other materials are possible.

The lower arm 38 has a first flange 44 with a first attachment formation 46, such as a hole through the first flange, however other attachment formations are possible. The first flange 44 may be in a plane that is generally parallel with the bottom surface 28 of the rear cross member 20, and extends from a first clamp portion 48 of the lower arm 38. The first clamp portion 48 defines a part of the receiving channel 42, and may include a first leg 50 extending generally perpendicularly from the first flange 44, a second leg 52 extending generally perpendicularly from the first leg, and a third leg 54 extending generally perpendicularly from the second leg.

A shoulder portion 56 may extend from the third leg 54 of the first clamp portion 48, and has a width "w1" that is wider than the width of the first clamp portion. The shoulder portion 56 may be co-planar with the third leg 54 and includes a seat belt retainer opening 58. A web 60 of the seat belt 36 may be fed through the seat belt retainer opening 58, doubled-back and fixed to itself to attach the seat belt to the attachment clamp 34.

The upper arm 40 has a second flange 62 with a second attachment formation 64, such as a hole through the second flange, however other attachment formations are possible. The second flange 62 may have generally the same size and shape as the first flange 44, and may also be in a plane that is generally parallel with the top surface 26 of the rear cross member 20 and parallel with the first flange. The upper arm 40 and the lower arm 38 are fastenable to each other at the first flange 44 and the second flange 62. The second flange 62 extends from a second clamp portion 66 of the upper arm 40.

The second clamp portion 66 may include a fourth leg 68 extending generally perpendicularly from the second flange 62, and a fifth leg 70 extending generally perpendicularly from the fourth leg 68. Together with the first clamp portion 48, the second clamp portion 66 defines the receiving channel 42, which is configured to have generally the same size and shape as a standard rear cross member 20.

A body portion 72 extends from the fifth leg 70 of the second clamp portion 66 and may have an increased width with respect to the second clamp portion 66. The body portion 72 may be coplanar with the fifth leg 70, however other orientations are possible. At least one slot 74 is disposed generally transversely through the body portion 72, the slot having a width "w2" that is smaller than the width "w1" of the shoulder portion 56.

To link the lower arm 38 with the upper arm 40, the lower arm is introduced into the slot 74, the first flange 44 being received by the slot first, until the shoulder portion 56 of the lower arm 38 engages the body portion 72 of the upper arm. When the slot 74 in the upper arm 40 reaches the shoulder portion 56 of the lower arm 38, the lower arm is prevented from further travel through the slot.

The slot 74 has a depth "d1" that is larger than the depth/thickness "d2" of the lower arm 38 at the shoulder portion 56. In this configuration, the lower arm 38 and the upper arm 40 can hingedly pivot with respect to each other. When the attachment clamp 34 is attached to the rear cross member 20, the lower arm 38 and the upper arm 40 are pivoted with respect to each other so that the rear cross member 20 can be received between the first flange 44 and the second flange 62 and received by the receiving channel 42.

The receiving channel 42 may be configured to engage at least one surface of the seat frame 16. The receiving channel 42 of the attachment clamp 34 may be sized to engage the rear cross member 20, such that the lower arm 38 of the attachment clamp 34 engages the bottom surface 28 and the rear surface 32 of the rear cross member, and the upper arm 40 of the attachment clamp engages the top surface 26 of the rear cross member. When the rear cross member 20 is received within the receiving channel 42 of the attachment clamp 34, the first flange 44 and the second flange 62 are fastened together with a fastener 76, such as a bolt. In this configuration, the slot 74 in the upper arm cantilevers against the shoulder portion 56 of the lower arm 38, locking the attachment clamp 34 to the rear cross member 20.

At least one attachment clamp 34 is attached to the seat frame 16. A plurality of attachment clamps 34 may be attached to the seat frame 16 at selected locations along the length of the rear cross member 20 to accommodate one or more seat belts 36 for each bus seat 10 (See FIGS. 1 and 2).

In one embodiment of attachment clamp 34, two lower arms 38 are received by a single upper arm 40 (see FIG. 2). The upper arm 40 includes two slots 74 in the body portion 72 for receiving the two lower arms 38, such that two seat belt retainer openings 58 are provided for each attachment clamp 34. The second flange 62 may be sized to receive both the first flanges 44 of the two lower arms 38, or alternatively, the second flange may be two separate flanges to receive both of the first flanges of the two lower arms. In another embodiment, a plurality of lower arms 38 are received by a single upper arm 40, or alternatively, a plurality of upper arms are received by a single lower arm.

What is claimed is:

1. An attachment clamp for attaching a seat belt to a seat frame of a bus seat, the attachment clamp comprising:
    at least one upper arm having at least one slot disposed through the at least one upper arm;
    at least one lower arm that is received within the at least one slot of the at least one upper arm, the lower arm having a seat belt retainer opening configured to receive the seat belt; and
    a receiving channel defined by the at least one upper arm and the at least one lower arm, the receiving channel configured to receive the seat frame, wherein the upper arm and the lower arm are pivotable with respect to each other and wherein the upper arm and the lower arm are fastenable to each other, wherein the at least one lower arm has a first flange and the at least one upper arm has a second flange, wherein the first flange is fastened to the second flange with a fastener, the at least one lower arm includes a first clamp portion defining a part of the receiving channel, and the at least one upper arm includes a second clamp portion defining a part of the receiving channel, and the first clamp portion includes a first leg extending generally perpendicularly from the first flange, a second leg extending generally perpendicularly from the first leg, and a third leg extending generally perpendicularly from the second leg.

2. The attachment clamp of claim 1 further comprising a shoulder portion extending from the third leg of the first clamp portion, wherein the shoulder portion has a width that is wider than the width of the first clamp portion.

3. The attachment clamp of claim 2 wherein the shoulder portion includes the seat belt retainer opening for receiving the seat belt.

4. The attachment clamp of claim 1 wherein the second clamp portion includes a fourth leg extending generally perpendicularly from the second flange, and a fifth leg extending generally perpendicularly from the fourth leg.

5. The attachment clamp of claim 4 further comprising a body portion extending from the fifth leg of the second clamp portion, wherein the at least one slot is disposed through the body portion.

6. The attachment clamp of claim 1 wherein the at least one slot has a width that is smaller than the width of the shoulder portion.

7. The attachment clamp of claim 1, wherein the at least one slot has a depth that is larger than the depth of the at least one lower arm at the shoulder portion.

8. An attachment clamp for attaching a seat belt to a rear crossmember of a seat frame of a bus seat, the attachment clamp comprising:
    at least one lower arm having a first flange, a first clamp portion extending from the first flange, and a shoulder portion extending from the first clamp portion, wherein the shoulder portion has a first width;
    at least one upper arm having a second flange, a second clamp portion extending from the second flange, and a body portion extending from the second clamp portion, wherein the at least one lower arm is received within at least one slot of the at least one upper arm, wherein the at least one slot has a second width smaller than the first width; and
    a receiving channel defined by the at least one upper arm and the at least one lower arm, the receiving channel being configured to receive the rear crossmember of the seat frame, wherein the upper arm and the lower arm are pivotable with respect to each other, wherein the at least one lower arm comprises two lower arms received in one upper arm.

9. The attachment clamp of claim 8 wherein the first flange is fastened to the second flange with a fastener.

10. The attachment clamp of claim 8 wherein the receiving channel is generally rectangular in cross-section.

11. The attachment clamp of claim 8 wherein the at least one slot has a depth that is larger than a depth of the shoulder portion.

\* \* \* \* \*